United States Patent Office 3,272,060
Patented Sept. 13, 1966

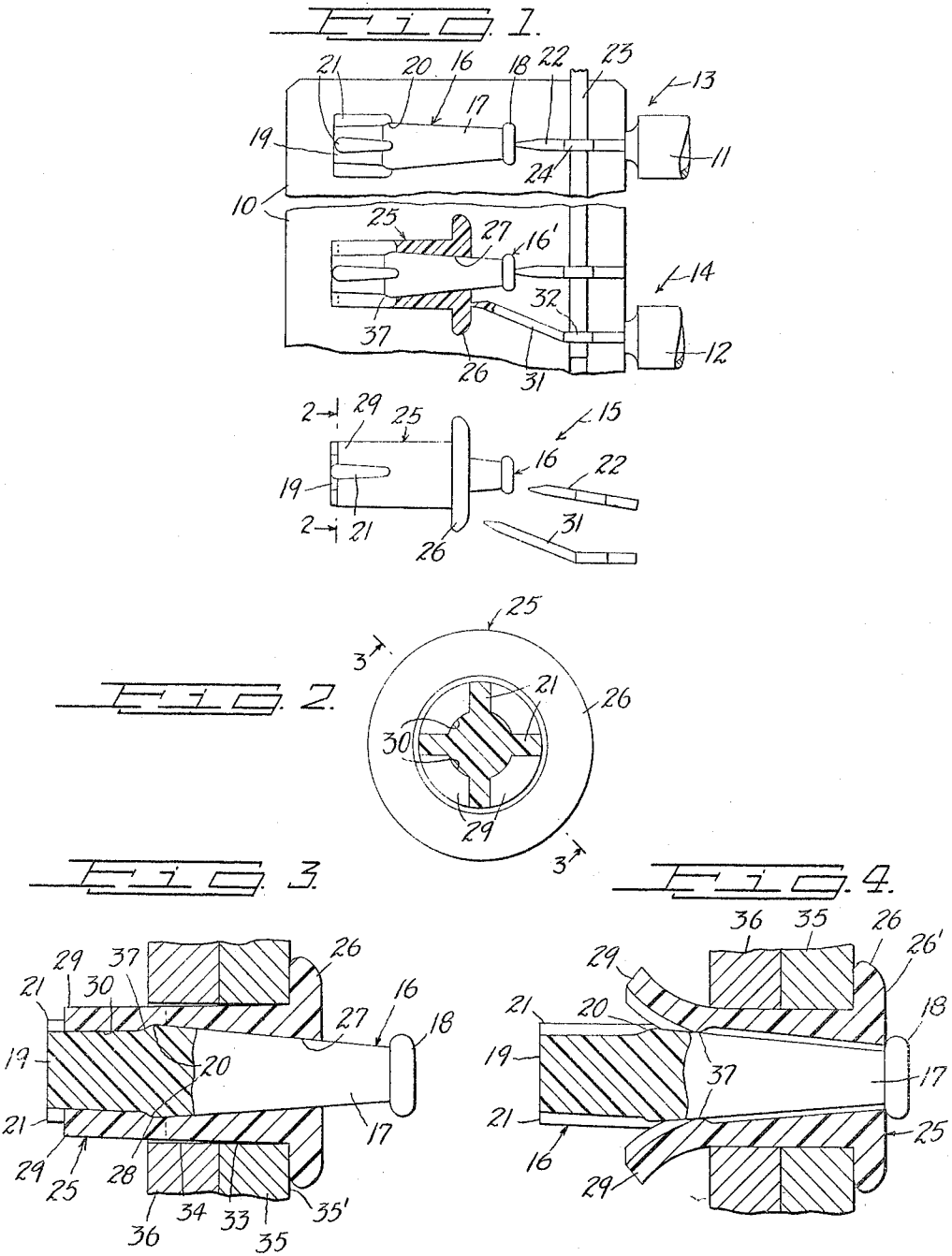

3,272,060
PLASTIC BLIND RIVET
Louis H. Morin, Bronx, N.Y.
(125 Beechwood Ave., New Rochelle, N.Y.)
Filed Apr. 24, 1964, Ser. No. 362,231
2 Claims. (Cl. 85—77)

This invention relates to what are generally referred to as blind or drive rivets employing a drive pin or stud operating in a tubular body part or casing to flare or spread anchor wing portions in the use of the rivet. More particularly, the invention deals in a device of the character defined, wherein the body portion is molded directly upon the stud and fashioned to conform with the contour of the stud in normal retention of the parts of the device against relative movement in initial handling and shipment thereof in accordance with the method herein defined. Still more particularly, the invention deals with a device of the character described, wherein the stud includes means keying the tubular body portion against rotation on the stud.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a diagrammatic exploded view illustrating the two forming stations and trimming station in the production of rivet devices of the character defined.

FIG. 2 is an enlarged section on the line 2—2 of FIG. 1.

FIG. 3 is a side and sectional view through a device made according to my invention illustrating its insertion into apertures of a pair of members to be secured together by the device; and FIG. 4 is a view, similar to FIG. 3, showing the device in operative position or, in other words, with the pin or stud of the device in its inwardly driven position.

In illustrating one adaptation and use of my invention and one method of producing rivet devices, I have illustrated in FIG. 1, in parts, the face view of a die 10 of a pair of dies and at 11 and 12 I have shown two injection nozzles for pressure injecting plastic material into spaced cavities of the dies, the nozzle 11 being at a first molding station 13; whereas, the nozzle 12 is at a second molding station 14 and at 15 I have diagrammatically illustrated the normal stripper and trimming station common with machines and methods in this art. For this reason, no detail showing of the stripper station is deemed to be necessary.

The cavities of the dies at the first molding station 13 form a stud part or member 16, comprising a tapered shank 17, having a drive head 18 at its outer end. The shank 17 terminates at its other end in a slightly tapered leading end portion 19 joining the shank 17 in an annular rounded shoulder 20. Arranged on the leading end portion 19 are circumferentially spaced inwardly tapering key ribs 21, four of these ribs being employed, as clearly noted in FIG. 2 of the drawing. Outer surfaces of the ribs 21 project beyond the largest diameter of the shank 17, including its shoulder 20. It will also be apparent, from a consideration of FIG. 1, that inner ends of the ribs 21 extend onto the shoulder portion 20 of the shank 17.

Formed integral with the stud 16 is a gate portion 22 which is molded around a transfer rod 23, as indicated at 24, so that, when the dies are open, the rod 23 can shift the formed stud 16 from the first molding station 13 for positioning at the second molding station 14 or, in other words, as illustrated at 16' in FIG. 1.

The second molding station 14 forms a tubular body part or casing 25 directly upon the stud positioned at the second station 14, as shown. The part 25 has an enlarged outer head 26 and the bore 27 of the sleeve conforms to the contour of the shank 17 and to the shoulder portion 20, as clearly seen at 28 in FIG. 3 of the drawing, and four anchor wings 29 are formed on the cylindrical portion 19 intermediate the key ribs 21, the contour of the anchor wings 29 being clearly seen in the end view of these wings in FIGS. 2 of the drawing. The inner rounded surfaces of the wings 29 are shown at 30 in said figure.

In molding the body part 25 at the second molding station 14, a gate 31 is formed, which also includes a portion 32 around the transfer rod 23. In a successive series of molding operations, it will be apparent that, when the rod 23 shifts the stud 16 to the second station 14, the assemblage as formed at the second station 14 is then shifted to a trimming station, where the gates 22 and 31 are trimmed off and also stripped from the rod 23, as is diagrammatically illustrated at the lower portion of FIG. 1 of the drawing. From the foregoing, it will be apparent that, in each cycle of operation of the molding machine, one assembled blind or drive rivet is produced and discharged from the machine into a suitable receptacle.

By providing the contours and engagements between the two rivet parts 16 and 25, as clearly illustrated in FIG. 3 of the drawing, it will appear that the parts are retained against relative movement and separation by the part 25 conforming with the surface contour of the stud part 16, as well as arrangement of the anchor wings 29 between the key ribs 21. This procedure is employed, as it facilitates packaging and shipment of the rivets and handling thereof, preparatory to insertion through alined apertures 33 and 34 of two members 35 and 36, respectively, which are to be riveted together by the use of one of my improved devices. This assemblage is clearly illustrated in FIG. 3 of the drawing, from which it will be noted that the head 26 of the body part 25 is brought into engagement with the exposed surface 35' of 35 and the stud 16 is in projected position, preparatory to be driven inwardly.

In FIG. 4 of the drawing, I have diagrammatically shown the result of inward drive of the stud 16 to the degree that the head 18 of the stud engages the outer surface 26' of the head 26. In this operation, the anchor wings 29 are flared outwardly, as diagrammatically illustrated in FIG. 4 of the drawing, by action of the shoulder 20 upon inner surfaces 30 of the wings and, upon completing this operation, the bead portions 37, at the inner ends of the wings 29, will seat upon the inner end portion of the shank 17 of the stud part 16, as diagrammatically illustrated in FIG. 4. The beads 37 are formed by virtue of the contour of the stud between the shoulder 20 and the cylindrical portion 19. The beads 37 may also be defined as shoulder portions at inner ends of the wings and formed adjacent the annular shoulder 20, as will be clear from a consideration of FIGS. 1 and 3 of the drawing. These shoulder portions cooperate in the initial flaring or spreading of the anchor wings, as will be apparent.

In forming the rivet devices from plastic material in accordance with the illustrations in the accompanying drawing, it is preferred that the stud 16 be molded from a relatively high melting point plastic material, such as nylon, whereas a material having a lower melting point, such as Delrin can be employed in forming the body part 25 directly on the stud part. In this manner, adhesion or fusion between the two parts is obviated. This will be necessary in any combination of materials that may be used.

Having fully described my invention, what I claim as new and desire to secure by Letters Patent is:

1. A blind rivet comprising assembled stud and body parts, each part having a head at one common end of said parts, the head of the stud part always projecting beyond the head of the body part, the stud part including a tapered shank of decreasing diameter toward its head, said shank having a coaxially disposed large diameter annular shoulder at its inner end, a slightly tapered leading end portion at the inner end portion of the stud part and radially projecting ribs on said slightly tapered leading end portion for keying the body part against rotation on the stud part, the body part including an internally tapered tubular portion normally snugly engaging said tapered shank, and the body part intermediate said keying means having circumferentially spaced anchor wing portions normally lying within the outside diameter of said tubular portion said ribs comprising circumferentially spaced longitudinal extending elements projecting through said body part between said spaced wing portions, said wings including at their inner end portions internal shoulders normally abutting the annular shoulder of said shank, said ribs extending axially toward the head from the terminus of the inner end of the stud to beyond the annular shoulder of said shank, said ribs being tapered from a portion of greatest circumferential extent adjacent said terminus toward said head, the adjacent abutting surfaces of said wing portions having a corresponding degree of taper conforming to the taper of said ribs and said slightly tapered leading end portion.

2. A rivet as defined in claim 1, wherein the stud and body parts are both composed of plastic material, and the stud part comprises a plastic material of a higher melting point than said body part.

References Cited by the Examiner
UNITED STATES PATENTS

| | | | |
|---|---|---|---|
| 1,104,544 | 7/1914 | Raeger | 85—77 |
| 2,089,578 | 8/1937 | Schaefer | 85—85 |
| 2,382,784 | 8/1945 | Emery | 264—250 |
| 2,561,433 | 7/1951 | Uhle | 85—84 |
| 2,826,110 | 3/1958 | Lemelson | 85—84 |
| 2,994,243 | 8/1961 | Langstroth | 85—78 |
| 2,997,910 | 8/1961 | Tinnerman | 85—77 |
| 3,009,384 | 11/1961 | Degen et al. | 85—77 |
| 3,057,016 | 10/1962 | Schilling | 264—250 |
| 3,105,407 | 10/1963 | Rapata | 85—84 |
| 3,112,547 | 12/1963 | Poe | 24—211 |
| 3,178,991 | 4/1965 | Bisbing | 85—84 |

CARL W. TOMLIN, *Primary Examiner.*

M. PARSON, JR., *Assistant Examiner.*